United States Patent [19]
Robertson et al.

[11] Patent Number: 5,652,780
[45] Date of Patent: *Jul. 29, 1997

[54] FILM PRESENCE INDICATOR

[75] Inventors: Jeffrey C. Robertson, Rochester; Clark E. Harris, Fairport, both of N.Y.

[73] Assignee: Eastman Kodak Company, Rochester, N.Y.

[*] Notice: The term of this patent shall not extend beyond the expiration date of Pat. No. 5,448,615.

[21] Appl. No.: 566,814

[22] Filed: Dec. 4, 1995

[51] Int. Cl.$^6$ .................................................. G03B 17/26
[52] U.S. Cl. ........................... 378/182; 378/165; 378/187
[58] Field of Search ........................................ 378/182, 184, 378/188, 187, 162, 165, 204

[56] References Cited

U.S. PATENT DOCUMENTS

| | | |
|---|---|---|
| 3,784,835 | 1/1974 | Schmidt . |
| 4,248,172 | 2/1981 | Krobel et al. . |
| 4,394,772 | 7/1983 | Okamoto et al. . |
| 4,444,484 | 4/1984 | Best et al. . |
| 4,582,018 | 4/1986 | Fleck et al. . |
| 4,744,100 | 5/1988 | Bauer et al. . |
| 4,807,271 | 2/1989 | Covington et al. . |
| 5,388,140 | 2/1995 | Robertson . |
| 5,448,615 | 9/1995 | Robertson ......................... 378/182 |

FOREIGN PATENT DOCUMENTS

| | | | |
|---|---|---|---|
| 281929 | 10/1979 | Germany ........................ | 378/182 |
| 249140 | 10/1988 | Japan ............................... | 378/182 |

*Primary Examiner*—David P. Porta
*Attorney, Agent, or Firm*—Susan L. Parulski

[57] ABSTRACT

An apparatus for indicating the presence or absence of a sheet within a cassette. The apparatus includes a plate and a mask stationarily mounted on a first side of the plate. An indicating element is movably mounted in overlapping orientation to the mask for one-dimensional movement between a first position wherein the indicating element and the mask define a first pattern indicative of the absence of the sheet, and a second position wherein the indicating element and the mask define a second pattern indicative of the presence of the sheet. A spring biases the indicating element in the first position, and a movable member moves the indicating element to define the second pattern when the sheet is positioned within the cassette. Alternatively, the indicating element is stationarily mounted and the mask is movably mounted for one-dimensional movement.

19 Claims, 11 Drawing Sheets

FILM PRESENCE INDICATOR

FIELD OF THE INVENTION

The invention relates to photographic cassettes, and more particularly, to a film sheet presence indicator for an x-ray cassette to indicate the presence or absence of a sheet of x-ray film within the cassette.

BACKGROUND OF THE INVENTION

It is often disadvantageous when an operator is unable to determine whether or not a photographic cassette has been loaded with a photosensitive sheet, without opening the cassette. To avoid this disadvantage, it has been proposed to include an indicator with the cassette which enables the operator to visually determine whether a sheet of film is present or absent within the cassette.

U.S. Pat. No. 4,394,772 discloses a pair of spaced plates, one of which is provided with a solar battery connected to a liquid crystal indicator. When the cassette is empty of film, the plates are in contact with one another, causing shorting and resulting in a blank indicator face. When the cassette is loaded with a film, the short-circuiting plates are isolated from each other by the film positioned therebetween, resulting in the indicator face displaying the word "FILM". In low light levels, as might be found in a photographic dark room used to load or unload film, such a solar apparatus may not provide a display indicating that the film is loaded.

U.S. Pat. No. 4,248,172 discloses an indicating element whose inner end is received in a recess of a cassette when film is absent from the cassette. The presence of the film into the cassette prevents the indicating element from entering the recess. The position of the indicating element may be ascertained either by touch or observation. With such an arrangement, visual verification may not be readily apparent.

U.S. Pat. No. 4,807,271, commonly assigned, discloses an end-loading cassette wherein a film sheet moving along an inlet path to its loaded position within the cassette causes its leading edge of the film sheet to slideably engage an indicator member, and move the indicator between a first and second position.

While the above apparatus have achieved a certain degree of success, a need continues to exist for a film presence indicator for use with a hinged cassette which provides an external visual verification which is readily apparent and easily readable by an operator, even in safe-light illuminated dark rooms. That is, such a film presence indicator should provide a large visual effect from a small travel distance of an actuating means. Further, such an apparatus must be compact since space is limited, long lasting, manufacturable, and if the film is photosensitive, ensure that the cassette remains light-tight.

SUMMARY OF THE INVENTION

An object of the invention is to provide an indicator which can automatically provide an easily readable, external visual verification of whether or not film is loaded within a cassette.

Another object of the invention is to provide such an apparatus which is long lasting and compact, and readily manufacturable.

Yet a further object of the invention is to provide such an apparatus which can be incorporated in a hinged, light-tight cassette, and does not adversely affect the light-tight characteristic of the cassette.

Still another object of the invention is to provide such an apparatus wherein a large visual effect is obtained from a small travel distance of an actuating means.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an apparatus for indicating the presence or absence of a sheet within a closed cassette. The apparatus includes a plate having a first and a second side, and a mask disposed on the first side of the plate. An indicating element is disposed in overlapping orientation to the mask and is movable relative to the mask for one-dimensional movement between a first position wherein the indicating element and the mask define a first pattern indicative of the absence of the sheet, and a second position wherein the indicating element and the mask define a second pattern indicative of the presence of the sheet. Biasing the indicating element toward the first position is a spring. A movable member moves the indicating element to the second position when the sheet is positioned within the cassette. In a first embodiment, the spring flexes in a plane perpendicular to the plate, while in a second embodiment, the spring deflects in a plane parallel with the plate.

According to another aspect of the invention, there is provided an apparatus for indicating the presence or absence of a sheet within a closed cassette. The apparatus includes a plate having a first and a second side, and an indicating element stationarily mounted on the first side of the plate. A mask is movably mounted in overlapping orientation to the indicating element for one-dimensional movement relative to the indicating element between a first position wherein the mask and the indicating element define a first pattern indicative of the absence of the sheet, and a second position wherein the mask and the indicating element define a second pattern indicative of the presence of the sheet. Biasing the mask toward the first position is a spring. A movable member moves the mask to the second position when the sheet is positioned within the cassette. In a first embodiment, the spring flexes in a plane perpendicular to the plate, while in a second embodiment, the spring deflects in a plane parallel with the plate.

According to a further aspect of the invention, there is provided a cassette comprising a first and second panel and a film presence indicator. The first and second panel cooperate to define an enclosed volume, with the first panel having a first and second side and being movable relative to the second panel between an open and closed position to provide access to the enclosed volume. The film presence indicator provides a means of indicating the presence or absence of a sheet within the cassette. The film presence indicator includes a mask stationarily mounted on the first side of the plate. An indicating element is movably mounted in overlapping orientation to the mask for one-dimensional movement relative to the mask between a first position wherein the indicating element and the mask define a first pattern indicative of the absence of the sheet, and a second position wherein the indicating element and the mask define a second pattern indicative of the presence of the sheet. Biasing the indicating element toward the first position is a spring. A movable member moves the indicating element to the second position when the sheet is positioned within the cassette.

It is an advantageous feature to provide a cassette with a compact film presence indicator which automatically provides an easily readable, external visual verification of whether or not a sheet is loaded within the closed cassette. The film presence indicator can be incorporated within a light-tight cassette, and is compact and durable.

BRIEF DESCRIPTION OF THE DRAWING

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
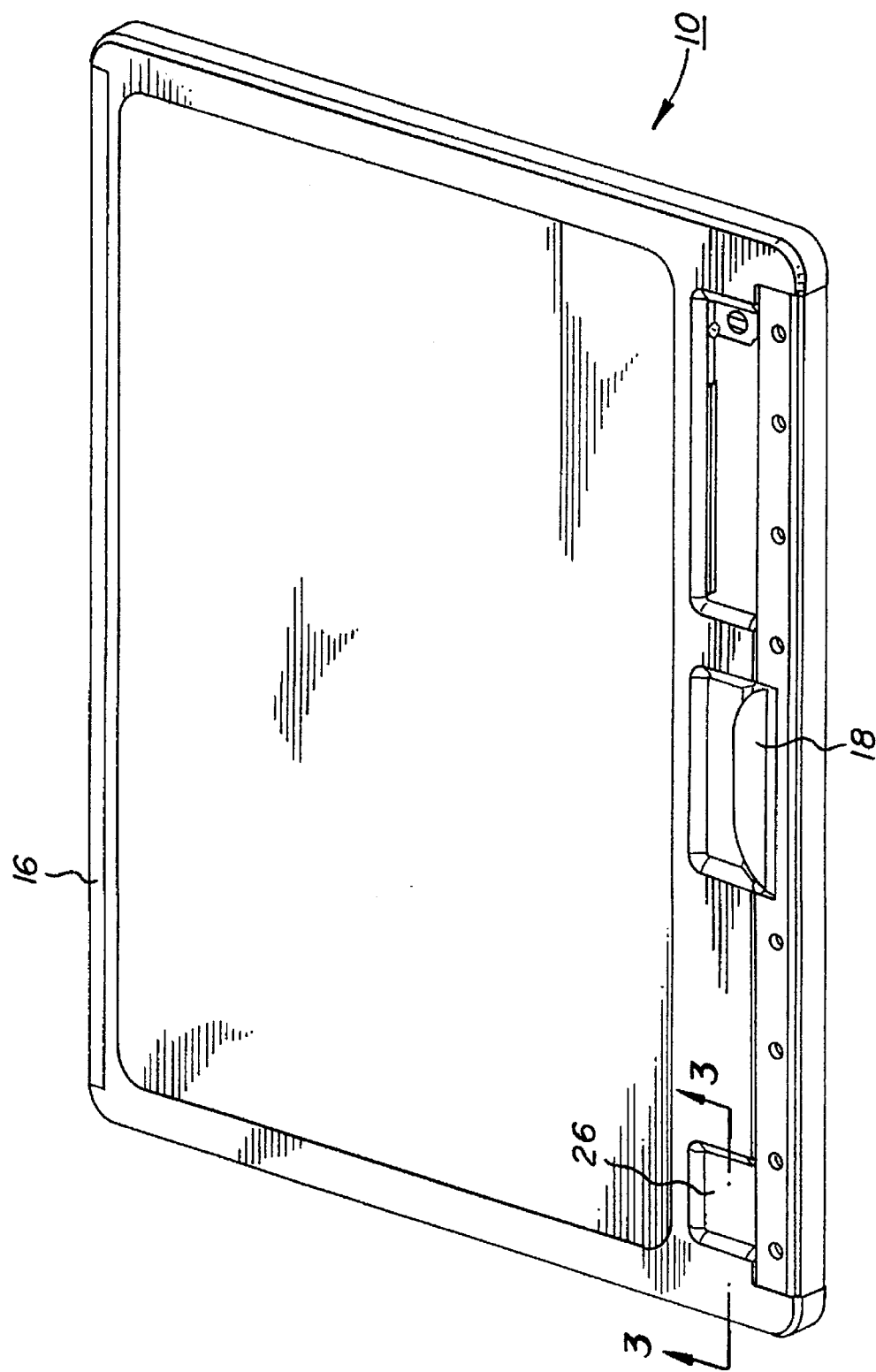
FIG. 1 shows a perspective view of light-tight cassette comprising the apparatus of the invention.

The following is a detailed description of the preferred embodiments of the invention, reference being made to the drawings in which the same reference numerals identify the same elements of structure in each of the several figures.

Figure 2:
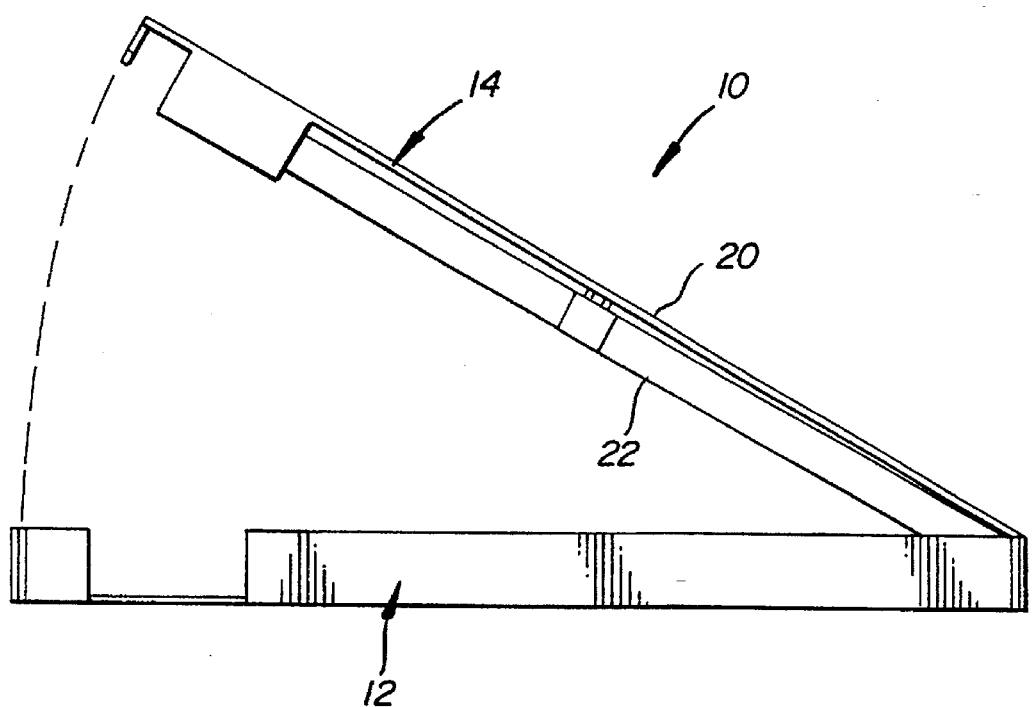
FIG. 2 shows a side view of the cassette of FIG. 1.
Figure 3:
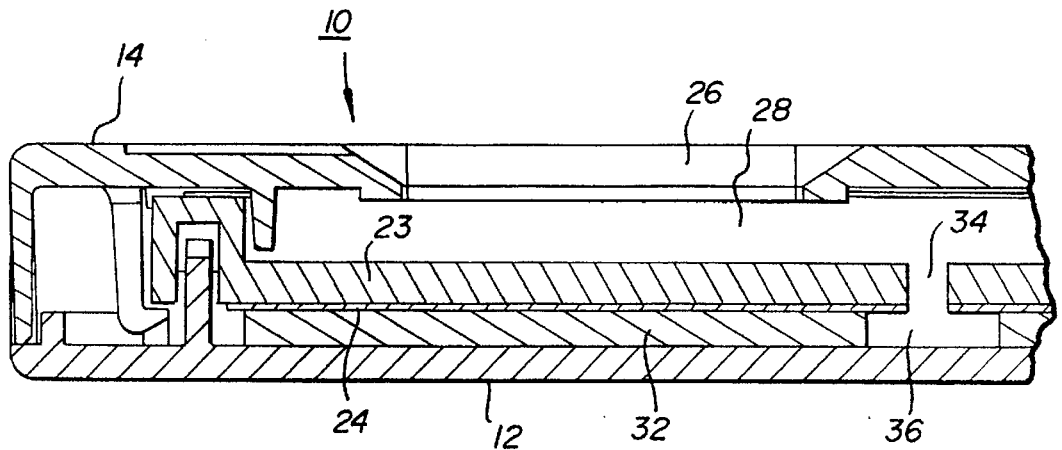
FIG. 3 is a partial cross-sectional view of the cassette taken along Line 3—3 of FIG. 1, with the film presence indicator deleted for clarity.
Figure 4:
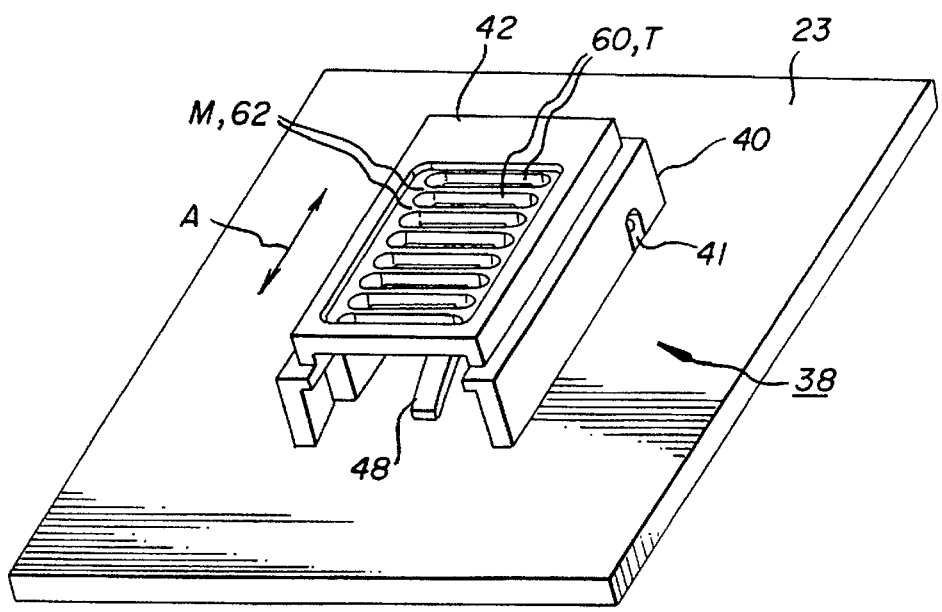
FIG. 4 shows a partial perspective view of a first embodiment of the film presence indicator according to the present invention.

FIGS. 1 through 3 illustrate a receptacle or cassette according to the present invention, such as an x-ray cassette. Commonly assigned U.S. Pat. No. 5,388,140, herein incorporated by reference, describes such an x-ray cassette. Cassette 10 includes a first panel or base 12 and a second panel or cover assembly 14 secured to base 12 by a hinge 16 cooperating to define an enclosed volume. A closure mechanism 18 holds cover assembly 14 against base 12 until released manually or by an appropriate film handling apparatus (not shown). Cover assembly 14 includes a cover 20 and a pressure plate assembly 22. Cover 20 includes a film presence indicator window 26 through which a film presence indicator can be viewed. Pressure plate assembly 22 includes a pressure plate 23 and, on its lower surface, a phosphor intensifying layer or screen 24. Suitable prompt emission or intensifying screens are well know to those skilled in the art. The interior of cassette 10, defined by the cover assembly 14 and base 12, forms an x-ray film receptacle configured to receive and tightly engage a sheet of x-ray film with screen 24.

Cassette 10 further includes a presence indicator receiving chamber 28 disposed between pressure plate 23 and indicator window 26. Cassette 10 further includes a resilient support pad 32, for example made of foam. When film is loaded in cassette 10, the film is disposed between pad 32 and screen 24, such that pad 32 urges film against screen 24. A receiving space 34 extends through pressure plate 23 and screen 24, so as to be in communication with an opening 36 through pad 32.

FIGS. 4 through 8 illustrate a fill presence indicator (FPI) 38 according to a first embodiment of the present invention. Mounted on pressure plate 23 within presence indicator receiving chamber 28, FPI 38 comprises a mounting support 40 having a pivot retainer 41, a mask 42, an indicating element 44 having a actuating engagement portion 46, an actuating means 48, and mounting means 50. Actuating means 48 includes an indicator engagement portion 52 adapted to engage actuating engagement portion 46, a resilient portion or spring 54, a contact portion or movable member 56 adapted to be received within receiving space 34, and a pivot portion 58 adapted for engagement within pivot retainer 41.

Mask 42 is stationarily mounted on pressure plate 23 by means of mounting support 40 engaging mounting means 50. Positioned between mask 42 and pressure plate 23, indicating element 44 is movably mounted in overlapping orientation to mask 42 to move in one-dimension relative to mask 42, over a distance d in a direction shown by arrow A in FIG. 4. Indicating element 44 moves between a first position (illustrated in FIG. 7) wherein mask 42 and indicating element 44 define a first pattern indicative of the absence of a sheet of film within cassette 10, and a second position (illustrated in FIG. 8) wherein mask 42 and indicating element 44 define a second pattern indicative of the presence of a sheet within cassette 10. To define the first and second patterns, mask 42 includes at least one opaque or masking area M and at least one transparent or non-masking area T, though preferably a plurality of masking M and non-masking T areas are present. Indicating element 44 has at least one indicating element feature F which corresponds with masking area M such that when indicating element 44 is in its first position, indicating element feature F is hidden by masking area M forming the first pattern, and when indicating element 44 is in its second position, indicating element feature F is visible through non-masking area T forming the second pattern. A plurality of indicating element features F and non-masking areas T increases the size of the visible pattern, and therefore the visual area increases, thereby providing superior readability of the pattern.

Figure 5:
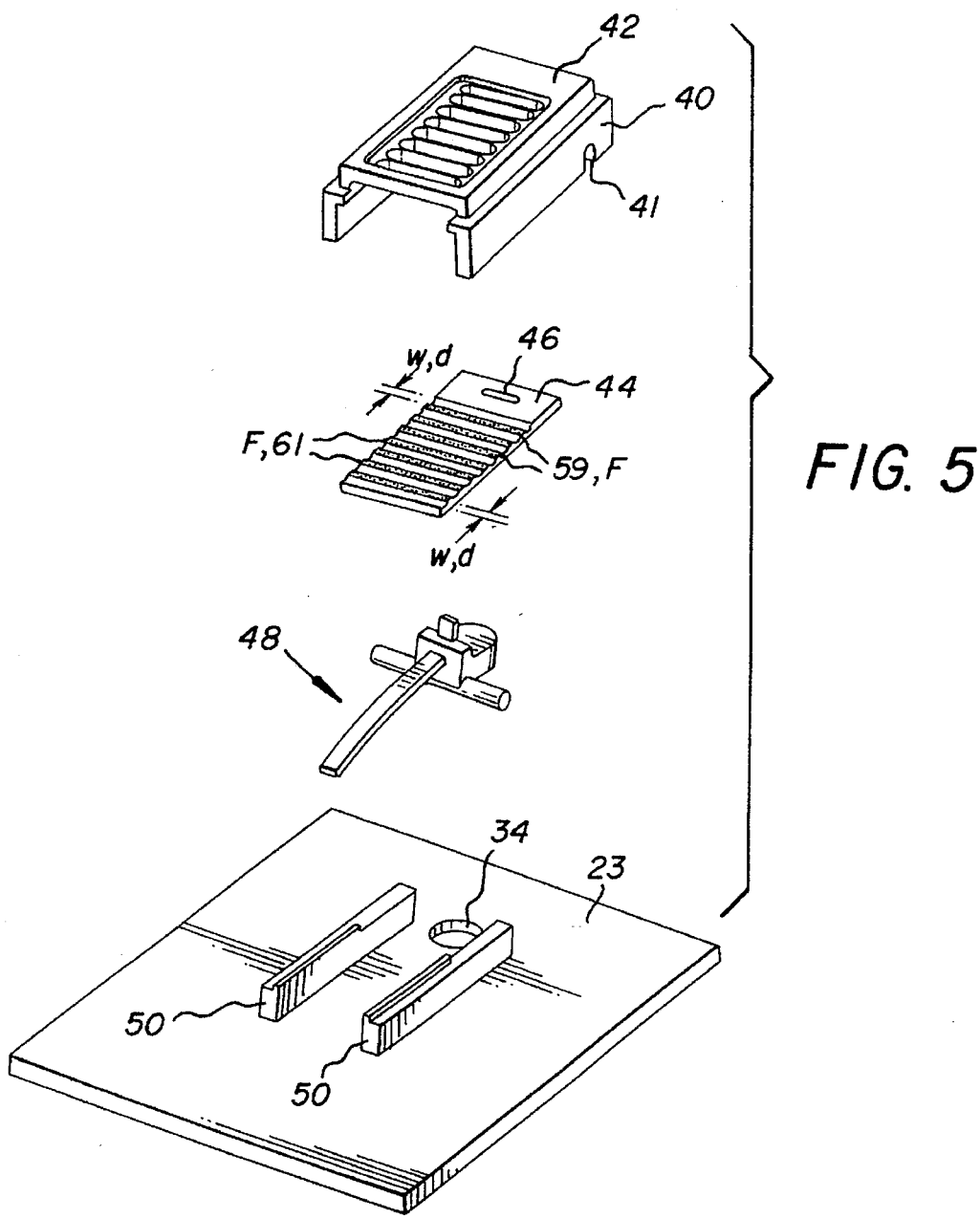
FIG. 5 shows an exploded view of the film presence indicator of FIG. 4.
Figure 6:
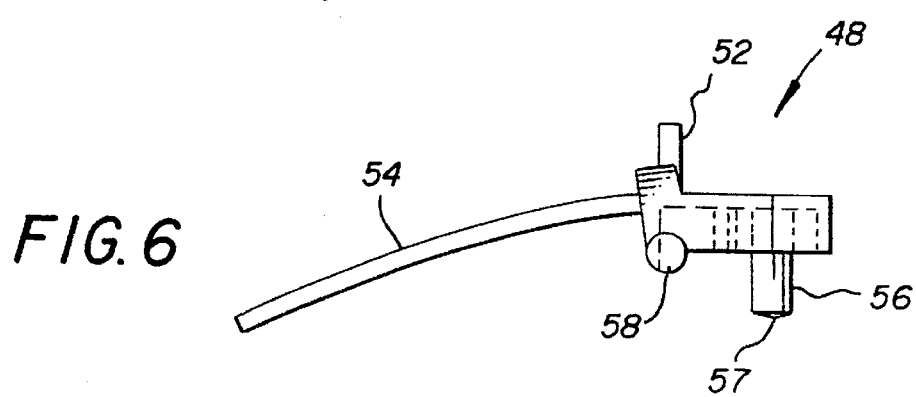
FIG. 6 shows a side plan view of the spring member of the film presence indicator of FIG. 5.
Figure 7:
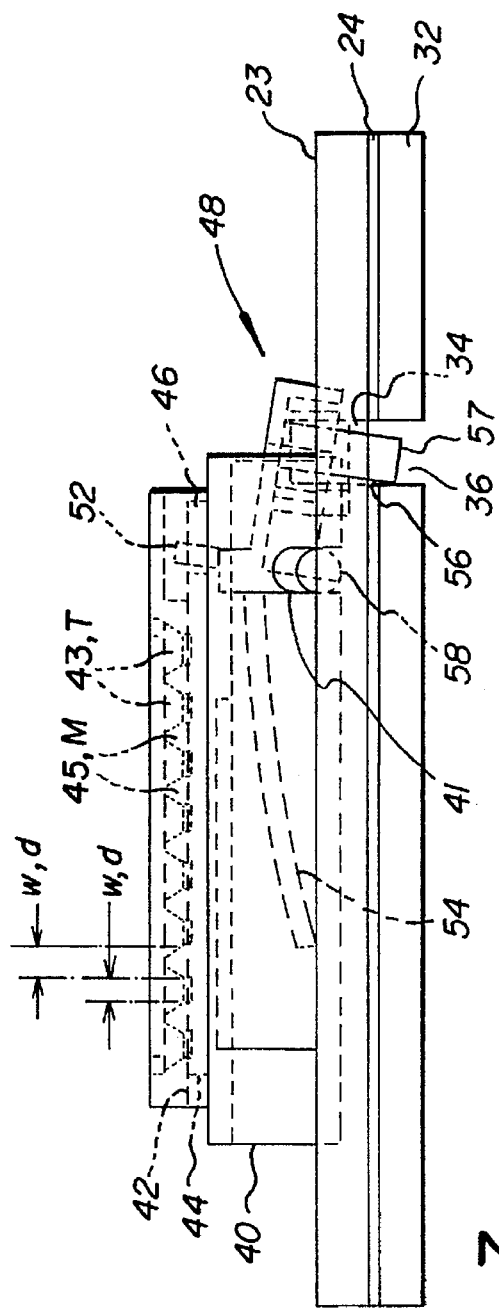
FIG. 7 shows a side plan view of the film presence indicator of FIG. 4 in a first position indicative of the absence of a sheet of film within the cassette. Internal structures are illustrated by dashed lines.

For example, in the embodiment illustrated in FIGS. 4 through 8, non-masking areas T are configured as rectangular slots 43 (i.e. open area through mask 42), transverse to the direction of movement, while masking areas M are configured as rectangular bars 45, transverse to the direction of movement. Corresponding, indicating element features F are configured as a pattern of stripes 59,61, for example, of alternating colors, as indicated in FIG. 5. Preferably, width w dimension of mask areas M and non-masking areas T are substantially equal to the movement distance d in the direction of movement. The width w of slots 43 and bars 45 in the direction of the one-dimensional movement is substantially equal to distance d, as is the width w of indicating element features F. With this configuration of mask 42 and indicating element 44, the patterns of indicating element 44 will be viewed through window 26. For example, dark stripes 59 will be viewable through window 26 when film presence indicator 38 is in the first position, and the alternate pattern, light stripes 61, will be viewable when indicating element 44 moves a distance d relative to mask 42.

Actuating means 48 is positioned to bias indicating element 44 toward the first position wherein mask 42 and indicating element 44 define the first pattern. In the first position, illustrated in FIG. 7, movable member 56 is received within receiving space 34, and protrudes or extends through to opening 36. Pivot portion 58 is received within pivot retainer 41, to allow a pivotal motion of actuating means 48 relative to mounting support 40, and indicator engagement portion 52 is engaged with actuating engagement portion 46.

Figure 8:
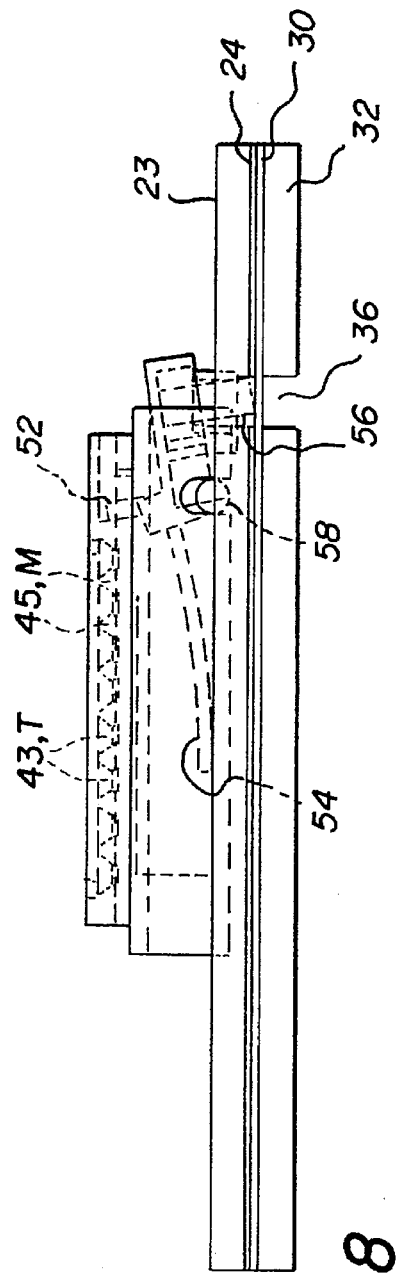
FIG. 8 shows a side plan view of the film presence indicator of FIG. 4 in a second position indicative of the presence of a sheet of film within the cassette. Internal structures are illustrated by dashed lines.

Referring now to FIG. 8, when cassette 10 is opened and a sheet 30 is positioned within cassette 10, the communication between receiving space 34 and opening 36 is blocked or destroyed by the presence of the sheet. Accordingly, when the cassette is closed, base 57 of movable member 56 abuts the sheet of film (flush with screen 24 of pressure plate assembly 22) and is positioned within receiving space 34. In such an orientation, actuating means 48 pivots against the bias of spring 48, about pivot portion 58. In pivoting, spring 54 flexes or deforms against pressure plate 23. As actuating means 48 pivots, indicator engagement portion 52 moves, and, through the engagement with indicating element 44, indicating element 44 travels by the distance d to the second position wherein the second pattern is defined by mask 42 and indicating element 44. In a suitable configuration, the width of slots 60, bars 62, and stripes 59,61 are approximately 0.040 inches wide.

Although the first embodiment has been described with indicating element 44 being movable relative to pressure plate 23, it will be understood by those skilled in the art that indicating element 44 may be stationarily mounted, and mask 42 movably mounted relative to pressure plate 23.

Although film presence indicator 38 is viewable through window 26, cassette 10 remains light-tight. Light through window 26 is prevented from reaching sheet 30 by means of a labyrinth structure around receiving space 34. This labyrinth acts as a light-lock, blocking the light from the sheet.

FIGS. 9 through 16 illustrate a film presence indicator (FPI) 60 according to a second embodiment of the present invention. Note that features of like elements of the first embodiment are comparable to the second embodiment. FPI 60 is mounted on pressure plate 23, within presence indicator receiving chamber 28. FPI 60 includes mask 42 stationarily mounted on pressure plate 23 by means of mounting supports 40 and mounting holes 62. FPI 60 further includes indicating element 44 having spring engagement portion 47 and elongated indicating element holes 63. Indicating element 44 is movably mounted in overlapping orientation to mask 42. By means of elongated indicating element holes 63, indicating element 44 is positioned on mounting supports 40 between mask 42 and pressure plate 23, and supported on indicating element ribs 64 having indicating element surfaces 66. Shoulders 68 of mounting supports 40 vertically support mask 42 marginally above indicating element 44. Actuating means 48 includes spring 54, an indicator engagement portion 52 adapted to engage spring engagement portion 47, and movable member 56. Movable member 56 comprises a channel 72 and an actuation surface 69. Actuating means 48 is mounted to pressure plate 23 by means of spring ribs 70. Spring 54 is comprised of three legs: first leg 71, second leg 73, and third leg 75. Legs 71,73,75 form an "M" shape, with legs 71,75 including a curved portion and leg 73 being non-curved. Leg 73 is disposed between legs 71,75 to mechanically associate legs 71,75.

As with the first embodiment, indicating element 44 is mounted in one-dimensional movement relative to mask 42, movable over a distance d in a direction shown by arrow B. Elongated indicating element holes 63 allow the sliding motion in the direction of elongation. Spring 54 is configured such that indicator engagement portion 52 engages indicating element 44 by means of spring engagement portion 47. Movable member 56 is mechanically associated with spring 54 by inserting a portion of leg 75 through channel 72.

Figure 9:
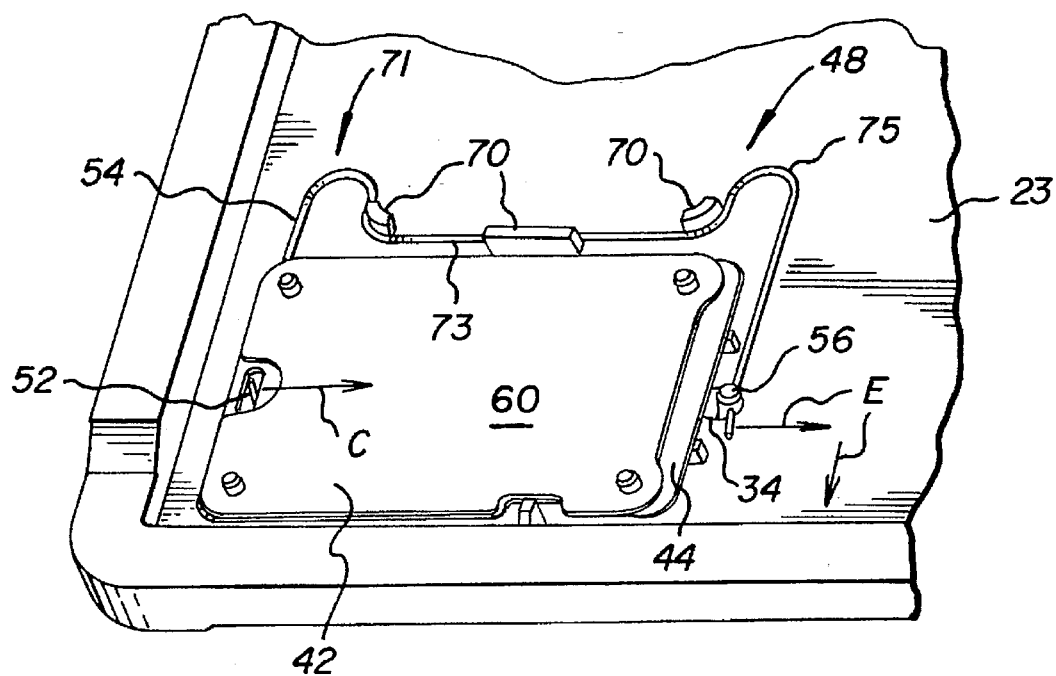
FIG. 9 shows a partial perspective view of a cassette comprising a second embodiment of the film presence indicator according to the present invention, the indicator being in a first position.
Figure 15:
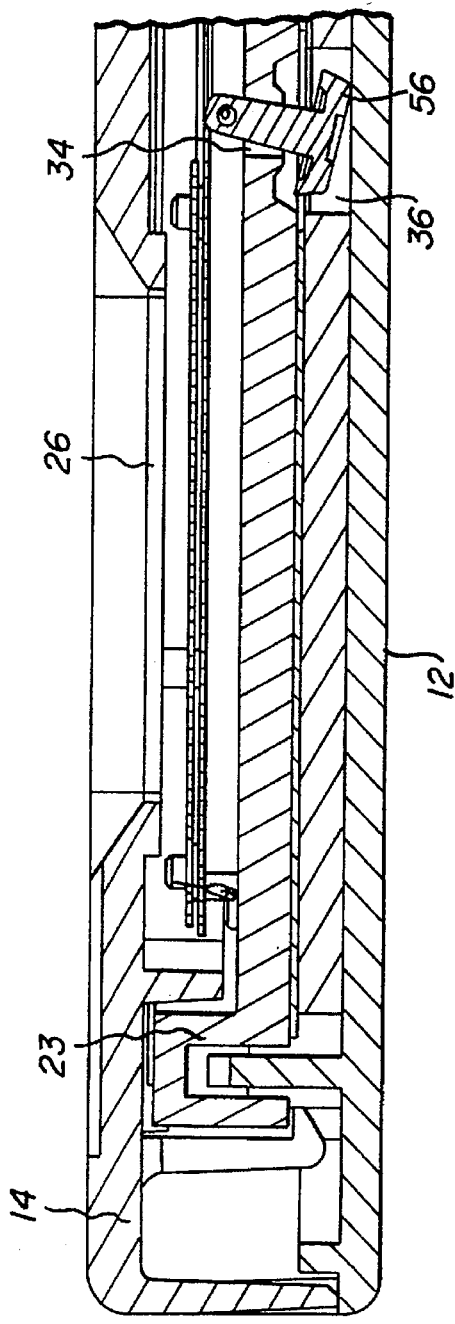
FIG. 15 shows a partial cross-sectional view of the cassette of FIG. 1 taken substantially along Line 3—3, illustrating the second embodiment of the film presence indicator in the first position, indicative of the absence of a sheet of film within the cassette.

With cassette 10 free of sheet 30, FPI 60 is positioned in a first position, illustrated in FIGS. 9 and 15. In this position, leg 71 of spring 54 is biased in the direction indicated by arrow C, biasing indicating element 44 in the same direction (by means of its engagement through spring engagement portion 47) to define a first pattern with mask 42. Leg 75 of spring 54 biases movable member 56 in the direction indicated by arrows E, and positions movable member 56 within receiving space 34 and extending through to opening 36. In this position, actuation surface 69 is free of contact with indicating element 44.

Figure 10:
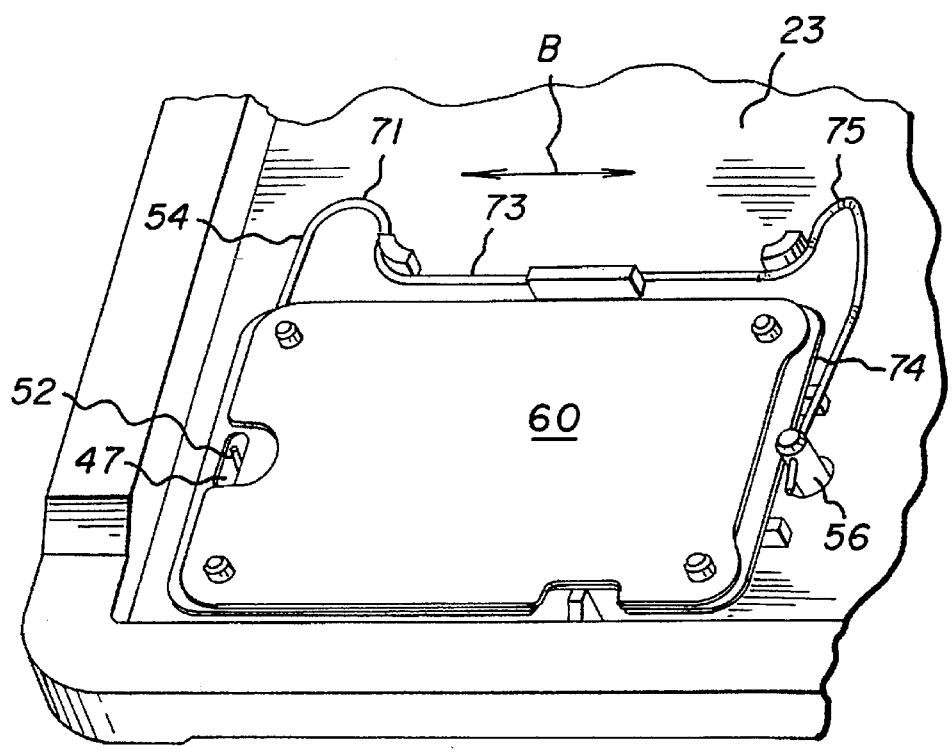
FIG. 10 shows the same view as FIG. 9, the indicator being in a second position.
Figure 11:
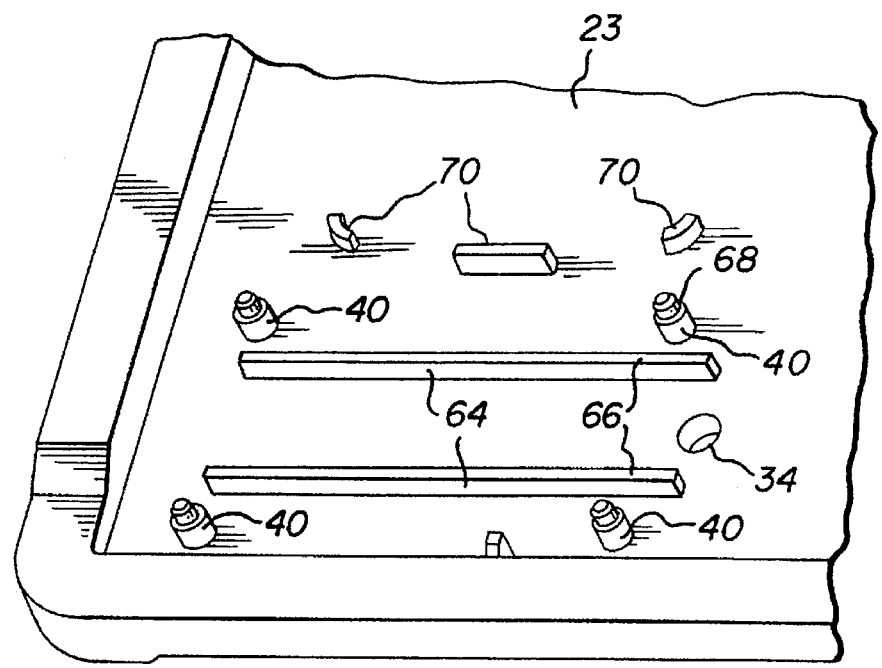
FIG. 11 shows the same view as FIG. 9 with portions of the film presence indicator removed to show the mounting structure.
Figure 12:
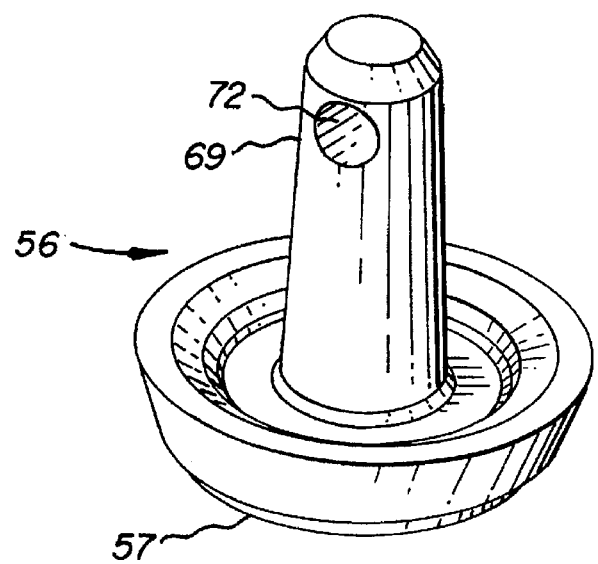
FIG. 12 shows the movable member of the second embodiment of the film presence indicator.
Figure 13:
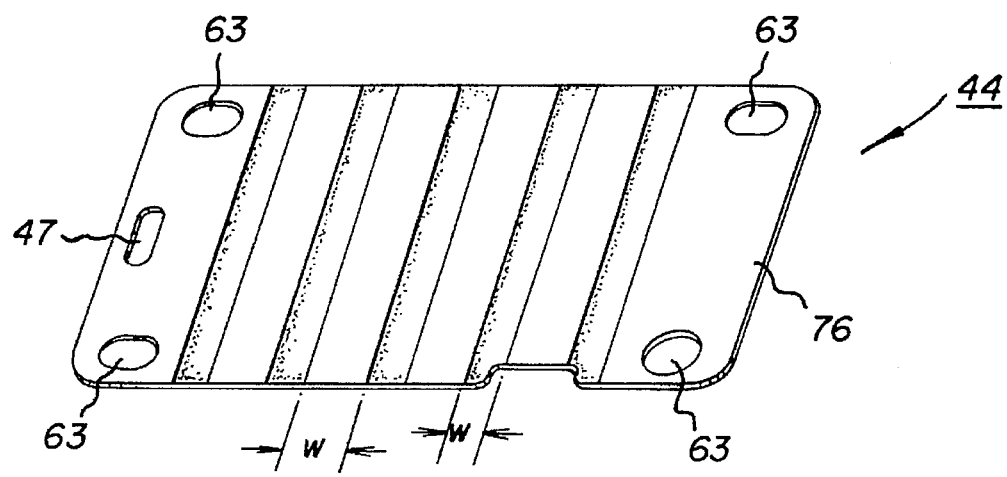
FIG. 13 shows the indicating element of the second embodiment of the film presence indicator.
Figure 14:
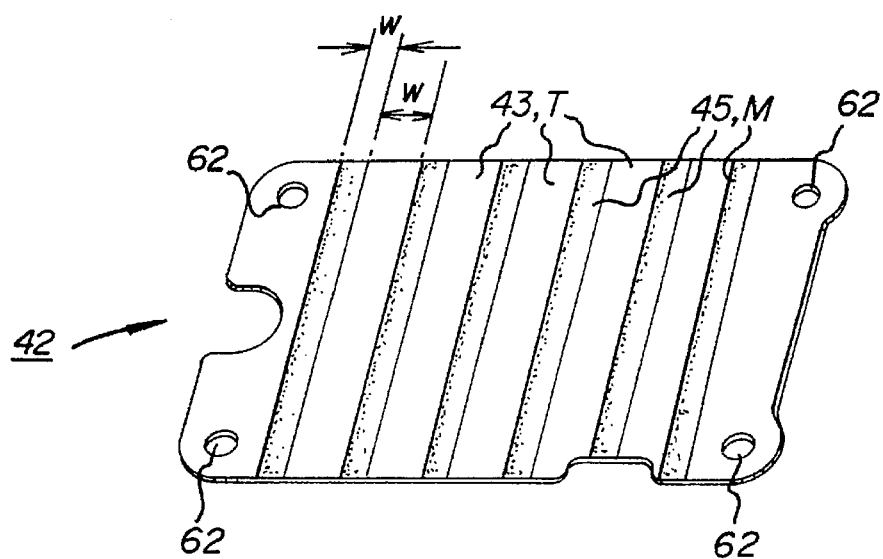
FIG. 14 shows the mask of the second embodiment of the film presence indicator.
Figure 16:
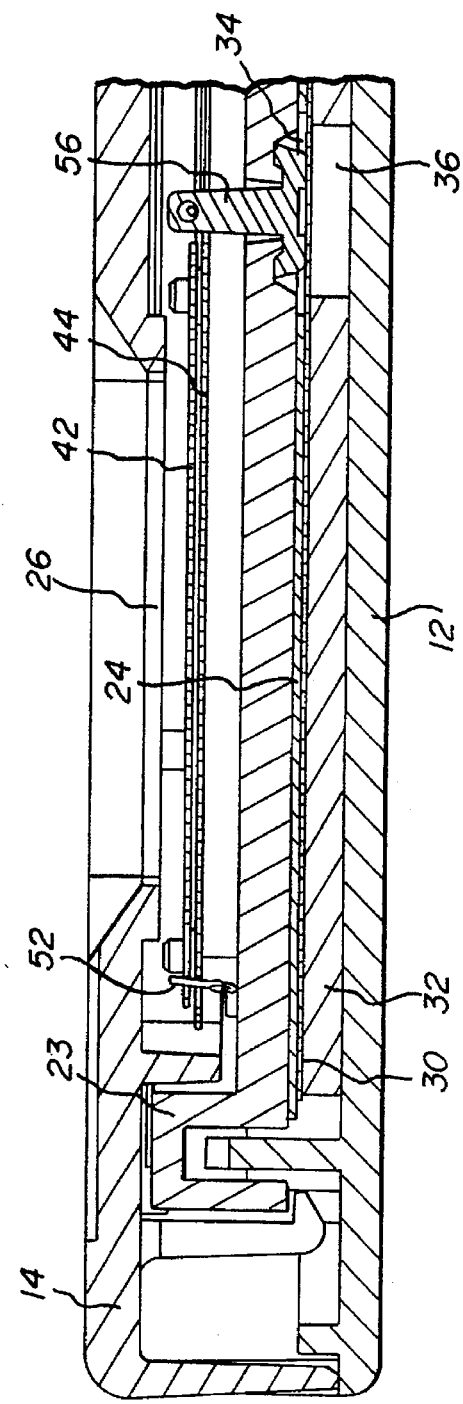
FIG. 16 shows the same view as FIG. 15, with the film presence indicator in the second position, indicative of the presence of a sheet of film within the cassette.

Illustrated in FIGS. 10 and 16, when sheet 30 is received and cassette 10 is closed, base 57 of movable member 56 contacts the sheet. Movable member 56 rocks and moves to a vertical orientation, positioning actuation surface 69 against edge 76 of indicating element 44, overcoming the bias of leg 71 and moving indicating element 44 in the direction opposite of arrow C. In overcoming this bias, spring 54 deflects or flexes in a plane parallel with plate 23, whereby indicating element 44 moves to the second position. Accordingly, the second pattern is formed by means of the relative movement of indicating element 44 and mask 42 to the second position.

Although the second embodiment has been described with indicating element 44 being movable relative to pressure plate 23, it will be understood by those skilled in the art that indicating element 44 may be stationarily mounted, and mask 42 movably mounted relative to pressure plate 23.

Various patterns can be defined by mask areas M, non-masking areas T, and indicating element features F. For example, indicating element 44 can be comprised of alternating color stripes such as green and red. Then in the first position, the operator will see a green pattern, indicating that no sheet is located within the cassette, and the cassette can be safely opened. In the second position, a red pattern would be visible through window 26, indicating that a sheet is loaded within the cassette.

Figure 17:
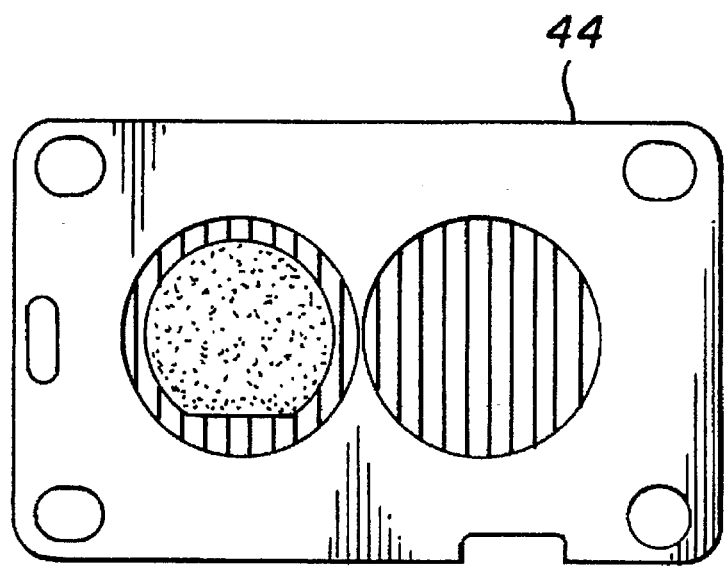
FIG. 17 shows the indicating element of either embodiment of the film presence indicator illustrating indicating element features.
Figure 18:
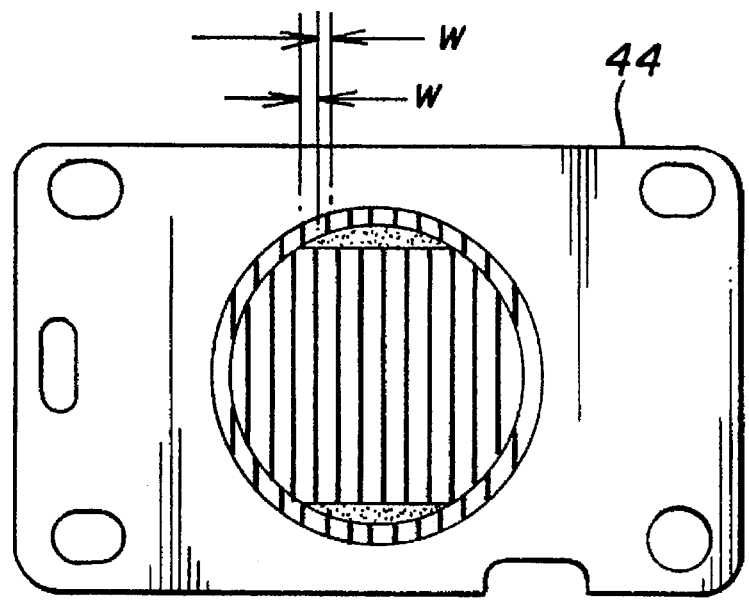
FIG. 18 shows the indicating element of either embodiment of the film presence indicator illustrating indicating element features.

Other examples, illustrated in FIGS. 17 and 18 show the indicating element represented by a hollow cylinder, and a completed or filled cylinder. In a first position, the operator would view a hollow cylinder pattern, indicating that the cassette is without a sheet. In the second position, the operator would view a completed cylinder pattern, indicating that the cassette is loaded with a sheet. However, with the indicating element of FIG. 17, the hollow and completed cylinders occupy different locations in window 26, while with the indicating element of FIG. 18, the two cylinders occupy the same location in window 26. Those skilled in the art will recognize that other patterns can be defined by the mask and indicating element to indicate the presence or absence of a sheet within the cassette.

Figure 19A:
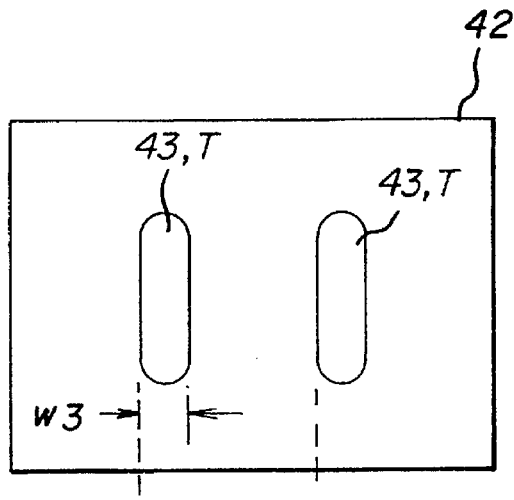
FIG. 19(a) shows the mask of either embodiment of the film presence indicator illustrating masking areas and non-masking areas.
Figure 19B:
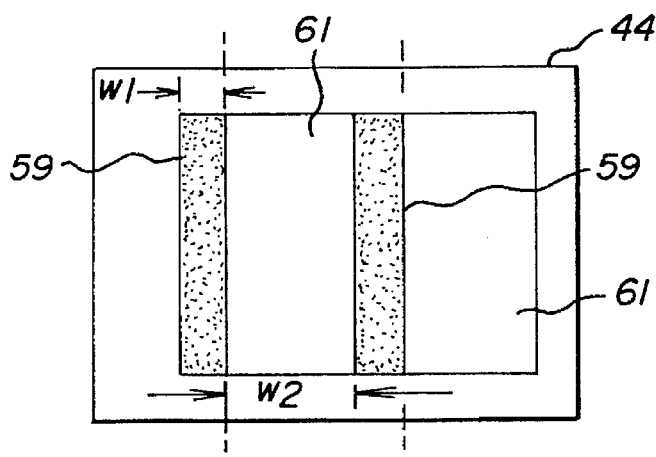
FIGS. 19(b) and 19(c) each show an indicating element adapted for cooperation with the mask of FIG. 19(a) to define a first and second pattern.
Figure 19C:
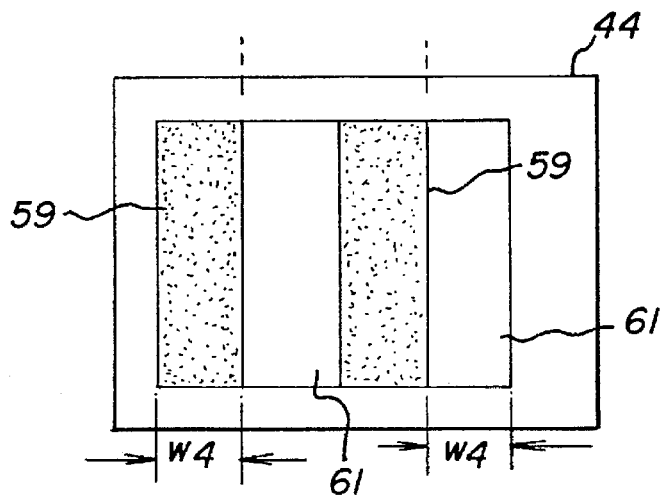

Those skilled in the art will recognize that the dimensions (i.e., width, height, and depth) of masking areas M and non-masking areas T need not be equal, and accordingly, the dimensions of indicating element features F do not need to equal to form the first and second patterns. Examples are illustrated in FIGS. 19(a) through 19(c). FIG. 19(a) shows mask 42 having slots 43 of width $w_3$. FIGS. 19(b) and 19(c) show two indicating elements 44 adapted for cooperation with mask 42 of FIG. 19(a) to define a first and second pattern. As illustrated in FIG. 19(b), stripes 59 have a width $w_1$ while stripes 61 have a width $w_2$; width $w_1$ is not equal to width $w_2$, and width $w_3$ of slots 43 is not equal to width $w_2$. As illustrated in FIG. 19(c), stripes 59 and stripes 61 have a width $w_4$, but width $w_4$ is greater than width $w_3$ of slots 43.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

Parts List 10 cassette
12 base
14 cover assembly
16 hinge
18 closure mechanism
20 cover
22 pressure plate assembly
23 pressure plate
24 phosphor, intensifying screen
26 cassette indicator window
28 presence indicator receiving chamber
30 sheet
32 resilient support pad
34 receiving space
36 opening
38 film presence indicator; first embodiment
40 mounting support
41 pivot retainer
42 mask
43 slot; T
44 indicating element
45 bar; M
46 actuating engagement portion
47 spring engagement portion
48 actuating means
50 mounting means
52 indicator engagement portion
54 spring; resilient portion
56 movable member; contact portion
57 base of movable member
58 pivot portion
59 dark stripes
60 film presence indicator; second embodiment
61 light stripes
62 mounting holes
63 elongated indicating element holes
64 indicating element ribs
66 indicating dement surfaces
68 mounting support shoulders
69 actuation surface
70 spring ribs
71 first leg of spring
72 channel in movable member
73 second leg of spring
74 edge of indicating element
75 third leg of spring
76 edge of indicating element

What is claimed is:

1. An apparatus for indicating the presence or absence of a sheet within a receptacle, said apparatus comprising:
   a plate including a first and a second side;
   a mask disposed on said first side of said plate;
   an indicating element disposed in overlapping orientation to said mask, said indicating element movable relative to said mask in one-dimension between a first position wherein said indicating element and said mask define a first pattern indicative of the absence of the sheet, and a second position wherein said indicating element and said mask define a second pattern indicative of the presence of the sheet;
   a spring biasing said indicating element toward said first position; and
   a movable member, said member moving said indicating element to said second position when the sheet is positioned within the receptacle, said indicating element being retained in said second position when the sheet is positioned within the receptacle.

2. The apparatus according to claim 1 wherein said mask is stationarily mounted on said first side of said plate, and said indicating element is movably mounted in overlapping orientation to said mask.

3. The apparatus according to claim 1 wherein said receptacle is a cassette and said sheet is x-ray film.

4. The apparatus according to claim 1 wherein the apparatus is incorporated in a cassette comprising a first and second panel cooperating to define an enclosed volume of the receptacle, said first panel including said plate, said first panel being movable relative to said second panel between a closed position and an open position to provide access to the enclosed volume.

5. The apparatus according to claim 1 wherein said indicating element is positioned between said mask and said first side of said plate.

6. The apparatus according to claim 1 wherein said mask includes at least one masking area and at least one non-masking area.

7. The apparatus according to claim 6 wherein said masking area is an opaque stripe and said non-masking area is a transparent stripe.

8. The apparatus according to claim 7 wherein said one-dimensional movement between said first and second position is of a distance d, and said transparent stripe and said opaque stripe have a width w substantially equal to said distance d.

9. The apparatus according to claim 1 wherein said indicating element includes at least one indicating element feature.

10. The apparatus according to claim 1 wherein said mask includes a plurality of masking areas and a plurality of non-masking areas, said indicating element includes a plurality of indicating element features, and said indicating element features having a width w in the direction of said one-dimensional movement.

11. The apparatus according to claim 1 wherein said movable member includes a first and a second end, said plate includes a receiving space extending through said plate from said first side to said second side, said movable member being movable within said receiving space, said second end of said movable member protruding from said second side of said plate when said indicating element is in said first position, said second end positioned within said receiving space when said indicating element is in said second position, said first end contacting said indicating element to move said indicating element to define said second pattern.

12. The apparatus according to claim 11 wherein said end of said movable member is planar, and said end is flush with said second side of said plate when said indicating element is in said second position.

13. An apparatus for indicating the presence or absence of a sheet within a receptacle, said apparatus comprising:
a plate including a first and a second side;
a mask disposed on said first side of said plate, said mask includes a plurality of masking areas and a plurality of non-masking areas;
an indicating element disposed in overlapping orientation to said mask, said indicating element movable relative to said mask in one-dimension between a first position wherein said indicating element and said mask define a first pattern indicative of the absence of the sheet, and a second position wherein said indicating element and said mask define a second pattern indicative of the presence of the sheet, said indicating element includes a plurality of indicating element features of stripes of alternating color, said indicating element features having a width w in the direction of said one-dimensional movement;
a spring biasing said indicating element toward said first position; and
a movable member, said member moving said indicating element to said second position when the sheet is positioned within the receptacle.

14. An apparatus for indicating the presence or absence of a sheet within a receptacle, said apparatus comprising:
a plate including a first and a second side;
a mask disposed on said first side of said plate;
an indicating element disposed in overlapping orientation to said mask, said indicating element movable relative to said mask in one-dimension between a first position wherein said indicating element and said mask define a first pattern indicative of the absence of the sheet, and a second position wherein said indicating element and said mask define a second pattern indicative of the presence of the sheet;
a spring biasing said mask toward said first position; and
a movable member, said member moving said mask to said second position when the sheet is positioned within the receptacle, said mask being retained in said second position when the sheet is positioned within the receptacle.

15. The apparatus according to claim 14 wherein said indicating element is stationarily mounted on said first side of said plate, and said mask is movably mounted in overlapping orientation to said mask.

16. A film cassette comprising:
a first and second panel cooperating to define an enclosed volume, said first panel including a plate having a first and second side and movable relative to said second panel between a closed position and an open position to provide access to the enclosed volume; and
a film presence indicator for indicating the presence or absence of a sheet within said enclosed volume, said film presence indicator including a mask disposed on said first side of said plate, an indicating element disposed in overlapping orientation to said mask, said indicating element movable relative to said mask in one-dimension between a first position wherein said indicating element and said mask define a first pattern indicative of the absence of the sheet, and a second position wherein said indicating element and said mask define a second pattern indicative of the presence of the sheet, a spring biasing said indicating element toward said first position, and a movable member, said member moving said indicating element to said second position when the sheet is positioned within said enclosed volume, said indicating element being retained in said second position when the sheet is positioned within the receptacle.

17. A film cassette comprising:
a first and second panel cooperating to define an enclosed volume, said first panel including a plate having a first and second side and movable relative to said second panel between a closed position and an open position to provide access to the enclosed volume; and
a film presence indicator for indicating the presence or absence of a sheet within said enclosed volume, said film presence indicator including a mask disposed on said first side of said plate, an indicating element disposed in overlapping orientation to said mask, said mask movable relative to said indicating element in one-dimension between a first position wherein said indicating element and said mask define a first pattern indicative of the absence of the sheet, and a second position wherein said indicating element and said mask define a second pattern indicative of the presence of the sheet, a spring biasing said mask toward said first position, and a movable member, said movable member moving said mask to said second position when the sheet is positioned within said enclosed volume, said mask being retained in said second position when the sheet is positioned within the receptacle.

18. An apparatus for indicating the presence or absence of a sheet within a receptacle, said apparatus comprising:
a plate including a first and a second side;
a mask stationarily mounted on said first side of said plate;
an indicating element movably mounted in overlapping orientation to said mask for one-dimensional movement relative to said mask between a first position wherein said indicating element and said mask define a first pattern indicative of the absence of the sheet, and a second position wherein said indicating element and said mask define a second pattern indicative of the presence of the sheet; and actuating means biasing said indicating element toward said first position, said actuating means including a resilient spring, an indicator engagement portion engaging said indicating element, a pivot portion about which said actuating means pivots, and a movable member, said spring flexing in a plane perpendicular to said plate such that said actuating means pivots about said pivot portion and moves said indicating element to said second position when the sheet is positioned within the receptacle, said indicating element being retained in said second position when the sheet is positioned within the receptacle.

19. An apparatus for indicating the presence or absence of a sheet within a receptacle, said apparatus comprising:

a plate including a first and a second side;

a mask stationarily mounted on said first side of said plate;

an indicating element movably mounted in overlapping orientation to said mask for one-dimensional movement relative to said mask between a first position wherein said indicating element and said mask define a first pattern indicative of the absence of the sheet, and a second position wherein said indicating element and said mask define a second pattern indicative of the presence of the sheet;

a spring biasing said indicating element toward said first position; and a movable member biased toward an initial position wherein said indicating element is in said first position, said movable member overcoming said bias to deflect said spring in a plane parallel with said plate when the sheet is positioned within the receptacle and moving said indicating element to said second position, said indicating element being retained in said second position when the sheet is positioned within the receptacle.

* * * * *

UNITED STATES PATENT AND TRADEMARK OFFICE
CERTIFICATE OF CORRECTION

PATENT NO. : 5,652,780
DATED : July 29, 1997
INVENTOR(S) : Jeffrey C. Robertson, et al It is certified that error appears in the above-identified patent and that said Letters Patent is hereby corrected as shown below:

On the title page, -- Related U.S. Application Data
Item [60] Provisional application No. 60/003,068 Aug. 31, 1995.--

Signed and Sealed this

Twenty-seventh Day of January, 1998

Attest:

BRUCE LEHMAN

*Attesting Officer*  *Commissioner of Patents and Trademarks*